US012625794B1

(12) United States Patent
Singh et al.

(10) Patent No.: US 12,625,794 B1
(45) Date of Patent: \*May 12, 2026

(54) TRAINING AND/OR USING MACHINE LEARNING MODEL(S) FOR AUTOMATIC GENERATION OF TEST CASE(S) FOR SOURCE CODE

(71) Applicant: GOOGLE LLC, Mountain View, CA (US)

(72) Inventors: Rishabh Singh, San Jose, CA (US); David Andre, San Francisco, CA (US)

(73) Assignee: GOOGLE LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/424,569

(22) Filed: Jan. 26, 2024

Related U.S. Application Data

(63) Continuation of application No. 17/318,436, filed on May 12, 2021, now Pat. No. 11,899,566.

(60) Provisional application No. 62/704,572, filed on May 15, 2020.

(51) Int. Cl.
| | |
|---|---|
| *G06F 11/3668* | (2025.01) |
| *G06N 5/04* | (2023.01) |
| *G06N 20/00* | (2019.01) |

(52) U.S. Cl.
CPC ...... *G06F 11/3684* (2013.01); *G06F 11/3688* (2013.01); *G06N 5/04* (2013.01); *G06N 20/00* (2019.01)

(58) Field of Classification Search
CPC . G06F 11/3684; G06F 11/3688; G06N 20/00; G06N 5/04
See application file for complete search history.

(56) References Cited

U.S. PATENT DOCUMENTS

| | | | |
|---|---|---|---|
| 4,449,189 A | | 5/1984 | Feix et al. |
| 6,111,517 A | | 8/2000 | Atick et al. |
| 9,286,899 B1 | | 3/2016 | Narayanan |
| 2006/0261931 A1 | | 11/2006 | Cheng |
| 2007/0172099 A1 | | 7/2007 | Park et al. |
| 2013/0286161 A1 | | 10/2013 | Lv et al. |
| 2014/0016835 A1 | | 1/2014 | Song et al. |
| 2015/0095895 A1 | | 4/2015 | Taneja |
| 2015/0162006 A1 | | 6/2015 | Kummer |
| 2015/0242396 A1 | | 8/2015 | Su |
| 2016/0179659 A1* | | 6/2016 | Champlin-Scharff ...................... G06F 40/211 717/126 |
| 2016/0248768 A1 | | 8/2016 | McLaren et al. |

(Continued)

OTHER PUBLICATIONS

Fischbach, Jannik, et al. "Automated generation of test models from semi-structured requirements." 2019 IEEE 27th International Requirements Engineering Conference Workshops (REW). IEEE, 2019. (Year: 2019).*

(Continued)

*Primary Examiner* — Thuy Dao
*Assistant Examiner* — Joanne G Macasiano
(74) *Attorney, Agent, or Firm* — Gray Ice Higdon

(57) ABSTRACT

Training and/or utilization of machine learning model(s) (e.g., neural network model(s)) in automatically generating test case(s) for source code. Techniques disclosed herein can be utilized in generating test case(s) for unit test testing (or other white-box testing) and/or for functional testing (or other black-box testing).

19 Claims, 5 Drawing Sheets

(56) References Cited

U.S. PATENT DOCUMENTS

| | | | | |
|---|---|---|---|---|
| 2017/0110144 | A1 | 4/2017 | Sharifi et al. | |
| 2017/0169354 | A1* | 6/2017 | Diamanti | G06F 16/00 |
| 2017/0199998 | A1 | 7/2017 | Bruno et al. | |
| 2018/0357145 | A1* | 12/2018 | Sarangapani | G06F 8/51 |
| 2019/0004932 | A1* | 1/2019 | Misra | G06F 11/3698 |
| 2019/0087311 | A1 | 3/2019 | Donaldson | |
| 2019/0108443 | A1* | 4/2019 | Dwarakanath | G06F 11/3684 |
| 2019/0278894 | A1 | 9/2019 | Andalo et al. | |
| 2019/0342339 | A1 | 11/2019 | Nanda et al. | |
| 2019/0377736 | A1* | 12/2019 | Balasubramanian | G06F 11/3692 |
| 2020/0019493 | A1* | 1/2020 | Ramakrishna | G06F 11/3688 |
| 2020/0133662 | A1* | 4/2020 | Smith | G06N 3/0464 |
| 2020/0183816 | A1* | 6/2020 | Copty | G06F 11/3688 |
| 2020/0364507 | A1 | 11/2020 | Berry | |
| 2021/0283505 | A1* | 9/2021 | Bansal | A63F 13/67 |
| 2021/0303448 | A1* | 9/2021 | Subramanian Rajalakshmi | G06N 20/00 |
| 2022/0044119 | A1* | 2/2022 | Wang | G06N 20/00 |
| 2022/0276628 | A1* | 9/2022 | Canedo | G05B 19/056 |

OTHER PUBLICATIONS

Saes, Laurence. "Unit test generation using machine learning." Universiteit van Amsterdamg (2018). (Year: 2018).*

Zhang, Mengshi, et al. "Deeproad: Gan-based metamorphic testing and input validation framework for autonomous driving systems." Proceedings of the 33rd ACM/IEEE international conference on automated software engineering. (Year: 2018).*

Wang, Song; Leveraging Machine Learning to Improve Software Reliability; dated 2019.

Holmes, J. et al.; Using mutants to help developers distinguish and debug (compiler) faults; Software Testing, Verification and Reliability; 30.2 (2020); e1727; dated 2020.

Piech et al., "Human Languages in Source Code: Auto-Translation for Localized Instruction" arXiv:1909.04556v1 [cs. CL] dated Sep. 10, 2019. 7 pages. 2019.

Blasi et al., "Translating Code Comments to Procedure Specifications" Proceedings of 27th ACM SIG-SOFT International Symposium on Software Testing and Analysis (ISSTA' 18) ACM, New York, NY. 12 pages. https://doi.org/10.1145/3213846.3213872 2018.

Rabin et al., "Testing Neural Program Analyzers" arXiv:1908. 10711v2 [cs.LG] dated Sep. 25, 2019. 3 pages. 2019.

Aggarwal et al., "Using Machine Translation for Converting Python 2 Python 3 Code" PeerJ PrePrints. https://dx.doi.org/10.7287/peerj. preprints.1459v1. CC-BY 4.0 Open Acess dated Oct. 29, 2015. 4 pages. 2015.

Barone et al., "A parallel corpus of Python functions and documentation strings for automated code documentation and code generation" arXiv:1707.02275v1 [cs.CL] dated Jul. 7, 2017. 5 pages. 2017.

Saez et al., "Towards the detection of cross-language source code reuse" En Natural Language Processing and Information Systems. Springer Verlag (Germany). 6716:250-253. doi:10.1007/978-3-642-22327-3_31. 5 pages. 2011.

Bui "Towards Zero Knowledge Learning for Cross Language API Mappings" 2019 IEEE/ACM 41st International Conference on Software Engineering: Companion Proceedings (ICSE-Companion) 3 pages. 2019.

Akrouf et al., "A Multi-Modal Recognition System Using Face and Speech" IJCSI International Journal of Computer Sciences Issues, vol. 8, Issue 3, No. 1, May 2011 ISSN (Online): 1694-0814. 7 pages. 2011.

Albiol et al., "A fully automatic face recognition system using a combined audio-visual approach" 22 pages.

Beunder "Design of Continuous Authentication using Face Recognition" 20th Twente Student Conference on IT. Jan. 24, 2014, Enschede, The Netherlands. 8 pages. 2014.

Sundstrom, Alex; Investigation into Predicting Unit Test Failure Using Syntactic Source Code Features; 60 pages; dated 2018.

Berner, C. et al: Dota 2 with large scale deep reinforcement learning; arXiv preprint arXiv:1912.06680; dated 2019.

* cited by examiner

TRAINING AND/OR USING MACHINE LEARNING MODEL(S) FOR AUTOMATIC GENERATION OF TEST CASE(S) FOR SOURCE CODE

BACKGROUND

Computer software programming often requires developers to read and/or write source code (i.e., to program) in a specific higher-level programming language. Some non-limiting examples of higher-level programming languages include Java, C++, C, Python, Perl, etc.—each of which can have its own strengths, weaknesses, nuances, idiosyncrasies, etc.

To ensure quality and/or robustness of developed source code, various software testing techniques can be utilized. For example, so-called white-box testing can be utilized, such as unit testing that tests individual component(s) of software, such as a method (function) in a class. However, white-box testing requires developers to manually design test cases, which can require extensive usage of client device resources. Moreover, developers are often time-constrained and may not develop any (or insufficient) test cases. This can jeopardize the robustness and/or quality of the developed source code, which can, when it is deployed, lead to errors, unsafe operating conditions, and/or other drawbacks.

As another example, so-called black-box testing can additionally and/or alternatively be utilized, such as functional testing that feeds software component(s) various input(s) and examining the resulting output(s). The resulting output(s) can be evaluated with respect to functional requirements. However, black-box testing requires developers to manually design testing parameters, which can require extensive usage of client device resources. Moreover, developers are often time-constrained and may not develop any (or insufficient) black-box tests. This can jeopardize the robustness and/or quality of the developed source code, which can, when it is deployed, lead to errors, unsafe operating conditions, and/or other drawbacks. Further, the input(s) explored in black-box testing may not include those input(s) that would indeed lead to error(s) and/or such input(s) may only be explored through computationally expensive brute-force approaches that also require exploring a large quantity of input(s) that do not lead to error(s).

Further, these and/or other drawbacks are exacerbated in situations in which an entity (e.g., a company) wants to translate source code from a base higher-level programming language (e.g., C++) to a different target programming language. For example, it may be the case that unit tests are unavailable for the target programming language and existing programmers at the entity may lack expertise in the target programming language and be unable to manually generate unit tests and/or can be highly inefficient in doing so. The inefficiencies can lead to excess usage of client device resources utilized in generating unit tests. As another example, it may be the case that any functional tests are insufficient to explore appropriate edge input(s) and/or to do so in a computationally efficient manner.

SUMMARY

Implementations disclosed herein relate to training and/or utilization of machine learning model(s) (e.g., neural network model(s)) in automatically generating test case(s) for source code. Techniques disclosed herein can be utilized in generating test case(s) for unit test testing (or other white-box texting) and/or for functional testing (or other black-box testing).

In some implementations, the source code for which the test cases(s) are generated can include (or be restricted to) translated source code that is in a "target" programming language and that was translated from a "base" programming language. For example, the source code can be target source code that was automatically translated from the base programming language to the target programming language, without requiring any human intervention. The automatic translation can be performed utilizing one or more machine learning models and/or rules-based approaches. In implementations where the source code includes translated source code, disclosed techniques can be utilized in validating the translated source code to ensure that it is robust and/or accurate prior to being deployed for actual implementations.

The preceding is provided as an overview of only some implementations disclosed herein. These and other implementations are described in additional detail in the detailed description.

In some implementations, a method implemented by one or more processors is provided that includes identifying a plurality of ground truth source code, unit test pairs each including a corresponding ground truth source code unit, and a corresponding ground truth unit test for the ground truth source code unit. The method further includes, for each of the ground truth source code, unit test pairs, processing the corresponding ground truth source code unit, using a code-to-embedding machine learning model, to generate one or more corresponding code unit embeddings, processing the corresponding ground truth unit test, using the code-to-embedding machine learning model, to generate one or more corresponding unit test embeddings, and generating a corresponding positive training instance that includes the one or more corresponding code unit embeddings as input, and the one or more corresponding unit test embeddings as output. The method further includes, for each of the corresponding positive training instances, processing the corresponding one or more code unit embeddings of the input, using a code embedding-to-test embedding machine learning model, to generate one or more predicted unit test embeddings, and generating a corresponding error based on comparing the one or more predicted unit test embeddings to the one or more corresponding unit test embeddings of the output. The method further includes training the code embedding-to-test embedding machine learning model based on the corresponding errors.

This method and other implementations of technology disclosed herein may each optionally include one or more of the following features.

In some implementations, the method further includes, subsequent to training the code embedding-to-test embedding machine learning model, identifying a given source code unit, processing the given source code unit, using the code-to-embedding machine learning model, to generate one or more given source code unit embeddings, processing the given source code unit embedding, using the code embedding-to-test embedding machine learning model, to generate one or more given predicted unit test embeddings, using the one or more given predicted unit test embeddings to identify a given unit test for the given source code unit, and evaluating the given source code unit using at least the given unit test.

In some versions of those implementations, using the one or more given predicted unit test embeddings to identify the given unit test for the given source code unit includes processing the one or more given predicted unit test embeddings, using an embedding-to-code machine learning model, to generate the given unit test for the given source code unit. In some further versions of those implementations, processing the one or more given predicted unit test embeddings, using the embedding-to-code machine learning model, to generate the given unit test for the given source code unit includes generating a sequence of outputs based on processing the one or more given predicted unit test embeddings using the embedding-to-code machine learning model. The outputs of the sequence each include a corresponding probability distribution. Processing the one or more given predicted unit test embeddings, using the embedding-to-code machine learning model, to generate the given unit test for the given source code unit further includes generating the given unit test based on highest probabilities in the corresponding probability distributions of the sequence of outputs. In yet further versions of those implementations, the method further includes using the one or more given predicted unit test embeddings to identify an additional given unit test for the given source code unit. Evaluating the given source code unit is further using at least additional given unit test, and identifying the additional given unit test includes generating, based on the corresponding probability distributions of the sequence of outputs, the additional given unit test. The additional given unit test includes one or more portions that differ from the given unit test based on the one or more portions being generated based on non-highest probabilities in the corresponding probability distributions of the sequence of outputs.

In some versions of those implementations, using the one or more given predicted unit test embeddings to identify the given unit test for the given source code unit includes determining that the one or more given predicted unit test embeddings satisfy a distance threshold relative to a given one of the one or more corresponding unit test embeddings. The given unit test is the corresponding unit test used to generate the given one of the one more corresponding unit test embeddings. The method further includes, responsive to determining that the one or more given predicted unit test embeddings satisfy the distance threshold relative to the given one of the one or more corresponding unit test embeddings, and based on the given unit test being the corresponding unit test used to generate the given one of the one more corresponding unit test embeddings, identifying the given unit test. In some further versions of those implementations, the method further includes using the one or more given predicted unit test embeddings to identify an additional given unit test for the given source code unit. Evaluating the given source code unit is further using at least an additional given unit test, and identifying the additional given unit test includes determining that the one or more given predicted unit test embeddings also satisfy the distance threshold relative to an additional given one of the one or more corresponding unit test embeddings. Further, the additional given unit test is the corresponding unit test used to generate the additional given one of the one more corresponding unit test embeddings. The method further includes responsive to determining that the one or more additional given predicted unit test embeddings satisfy the distance threshold relative to the additional given one of the one or more corresponding unit test embeddings, and based on the additional given unit test being the corresponding unit test used to generate the additional given one of the one more corresponding unit test embeddings, identifying the given unit test.

In some versions of those implementations, the method further includes determining, based on the evaluating, to deploy the given source code unit in production.

In some versions of those implementations, the method further includes rendering, in a development application, one or more metrics that are based on the evaluating.

In some versions of those implementations, the given source code unit is in a second programming language and is an automated translation of a corresponding source code unit in a first programming language that is different from the second programming language, and the method further includes determining, based on the evaluating, whether to render the given source code unit in a development application as a suggested translation of the corresponding source code unit. In some further versions of those implementations, the given source code unit is one of multiple candidate automated translations of the corresponding source code unit. Determining, based on the evaluating, whether to render the given source code unit in the development application as the suggested translation includes determining, based on the evaluating, whether to render the given source code unit, or an alternate one of the automated translations, as a suggested translation of the corresponding source code unit.

In some implementations, the code embedding-to-test embedding machine learning model is a transformer neural network model or an encoder-decoder neural network model.

In some implementations, the code-to-embedding machine learning model is a graph neural network. Processing the corresponding ground truth source code unit, using the code-to-embedding machine learning model includes converting the corresponding ground truth source input into a graph structure, and processing the graph structure using the graph neural network.

In some implementations, the one or more corresponding code unit embeddings comprise a plurality of corresponding code unit embeddings, and the one or more corresponding unit test embeddings include a plurality of unit test embeddings.

In some implementations, a method implemented by one or more processors is provided that includes identifying a source code unit that is programmed in a programming language, processing the source code unit, using a code-to-embedding machine learning model, to generate one or more code unit embeddings in a latent space, and processing the corresponding one or more code unit embeddings, using a code embedding-to-test embedding machine learning model, to generate one or more predicted unit test embeddings in the latent space. The method further includes using the one or more predicted unit test embeddings to identify a unit test for the source code unit, and evaluating the source code unit using at least the unit test.

This method and other implementations of technology disclosed herein may each optionally include one or more of the following features.

In some implementations, using the one or more predicted unit test embeddings to identify the unit test for the source code unit includes processing the one or more predicted unit test embeddings, using an embedding-to-code machine learning model, to generate the unit test for the given source code unit. In some versions of those implementations, processing the one or more predicted unit test embeddings, using the embedding-to-code machine learning model, to generate the unit test for the source code unit includes generating a sequence of outputs based on processing the one or more predicted unit test embeddings using the embedding-to-code machine learning model. The outputs of the sequence each comprise a corresponding probability distribution. Using the embedding-to-code machine learning model, to generate the unit test for the source code unit further includes generating the unit test based on highest probabilities in the corresponding probability distributions of the sequence of outputs.

In some implementations, using the one or more predicted unit test embeddings to identify the unit test for the source code unit includes determining that the one or more predicted unit test embeddings satisfy a distance threshold relative to one or more pre-generated unit test embeddings for the unit test. The one or more pre-generated unit test embeddings are generated by processing the unit test using the code-to-embedding machine learning model. Using the one or more predicted unit test embeddings to identify the unit test for the source code unit further includes, responsive to determining that the one or more predicted unit test embeddings satisfy the distance threshold relative to the one or more pre-generated unit test embeddings for the unit test, identifying the unit test.

In some implementations, the method further includes determining, based on the evaluating, to deploy the source code unit in production. In some implementations, the method further includes rendering, in a development application, one or more metrics that are based on the evaluating.

In some implementations, the source code unit is in a second programming language and is an automated translation of a corresponding source code unit in a first programming language that is different from the second programming language, and the method further includes determining, based on the evaluating, whether to render the source code unit in a development application as a suggested translation of the corresponding source code unit.

In some implementations, the source code unit is one of multiple candidate automated translations of the corresponding source code unit. Determining, based on the evaluating, whether to render the source code unit in the development application as the suggested translation includes determining, based on the evaluating, whether to render the source code unit, or an alternate one of the automated translations, as a suggested translation of the corresponding source code unit.

In some implementations, a method implemented by one or more processors is provided that includes identifying base source code that is programmed in a base programming language, identifying target source code that is in a target programming language and that is generated based on automatically translating the base source code, processing the base source code, using a code-to-embedding machine learning model, to generate a base source code embedding in a latent space, processing the target source code, using the code-to-embedding machine learning model, to generate a target source code embedding in the latent space, processing, using a policy network, the base source code embedding and the target source code embedding, to generate a predicted test input, executing the base source code using the predicted test input to generate a base output, and executing the target source code using the predicted test input to generate a target output. The method further includes generating a reward based on comparing the base output to the target output. The reward is more positive when the comparing indicates the base output and the target output are not equal than when the comparing indicates the base output and the target output are equal. The method further includes updating the policy network based on the reward.

This method and other implementations of technology disclosed herein may each optionally include one or more of the following features.

In some implementations, the reward is a positive value when the comparing indicates the base output and the target output are not equal and wherein the reward is zero when the comparing indicates the base output and the target output are equal. In some versions of those implementations, the reward is one when the comparing indicates the base output and the target output are not equal.

In some implementations, the code-to-embedding machine learning model is a graph neural network, and processing the base source code, using the code-to-embedding machine learning model, includes converting the corresponding base source code into a graph structure, and processing the graph structure using the graph neural network.

In some implementations, the method further includes, subsequent to updating the policy network based on the reward and other rewards determined bad on other base source code, target source code pairs, identifying an additional base source code that is programmed in the base programming language, identifying an additional target source code that is in the target programming language and that is generated based on automatically translating the additional base source code, processing the additional base source code, using the code-to-embedding machine learning model, to generate an additional base source code embedding in a latent space, processing the additional target source code, using the code-to-embedding machine learning model, to generate an additional target source code embedding in the latent space, and processing, using the policy network, the additional base source code embedding and the additional target source code embedding, to generate an additional predicted test input. The method further includes executing the additional base source code using the predicted test input to generate an additional base output, executing the additional target source code using the predicted test input to generate an additional target output, and determining, based on comparing the additional base output and the additional target output, whether one or more branches of the additional target source code are a valid translation of the base source code.

In some implementations, a method implemented by one or more processors is provided that includes identifying base source code that is programmed in a base programming language, and identifying target source code that is in a target programming language and that is generated based on automatically translating the base source code. The method further includes processing the base source code, using a code-to-embedding machine learning model, to generate a base source code embedding in a latent space, and processing the target source code, using the code-to-embedding machine learning model, to generate a target source code embedding in the latent space. The method further includes processing, using a policy network, the base source code embedding and the target source code embedding, to generate a predicted test input. The policy network is trained, through reinforcement learning, to reward predictions of test inputs that result in differing outputs when used in testing a base source code, target source code pair. The method further includes executing the base source code using the predicted test input to generate a base output, executing the target source code using the predicted test input to generate a target output, and determining, based on comparing the base output and the target output, whether one or more branches of the additional target source code are a valid translation of the base source code.

This method and other implementations of technology disclosed herein may each optionally include one or more of the following features.

In some implementations, determining, based on comparing the base output and the target output, whether one or more branches of the additional target source code are a valid translation of the base source code, includes determining, based on the base output and the target output not being equal, that at least a given branch, involved in executing the target source code, is not a valid translation. In some versions of those implementations, the method further includes responsive to determining that at least the given branch, involved in executing the target source code, is not a valid translation, causing the given branch to be rendered, in a development application, with a particular demarcation.

In addition, some implementations include one or more processors (e.g., CPU(s), GPU(s), and/or TPU(s)) of one or more computing devices, where the one or more processors are operable to execute instructions stored in associated memory, and where the instructions are configured to cause performance of any of the methods disclosed herein. Some implementations also include one or more non-transitory computer readable storage media storing computer instructions executable by one or more processors to perform any of the methods disclosed herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Computing devices, systems, and engines depicted in in the figures herein may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems and/or engines can be implemented using one or more server computing devices that form what is sometimes referred to as a "cloud infrastructure," although this is not required.

Figure 1A:
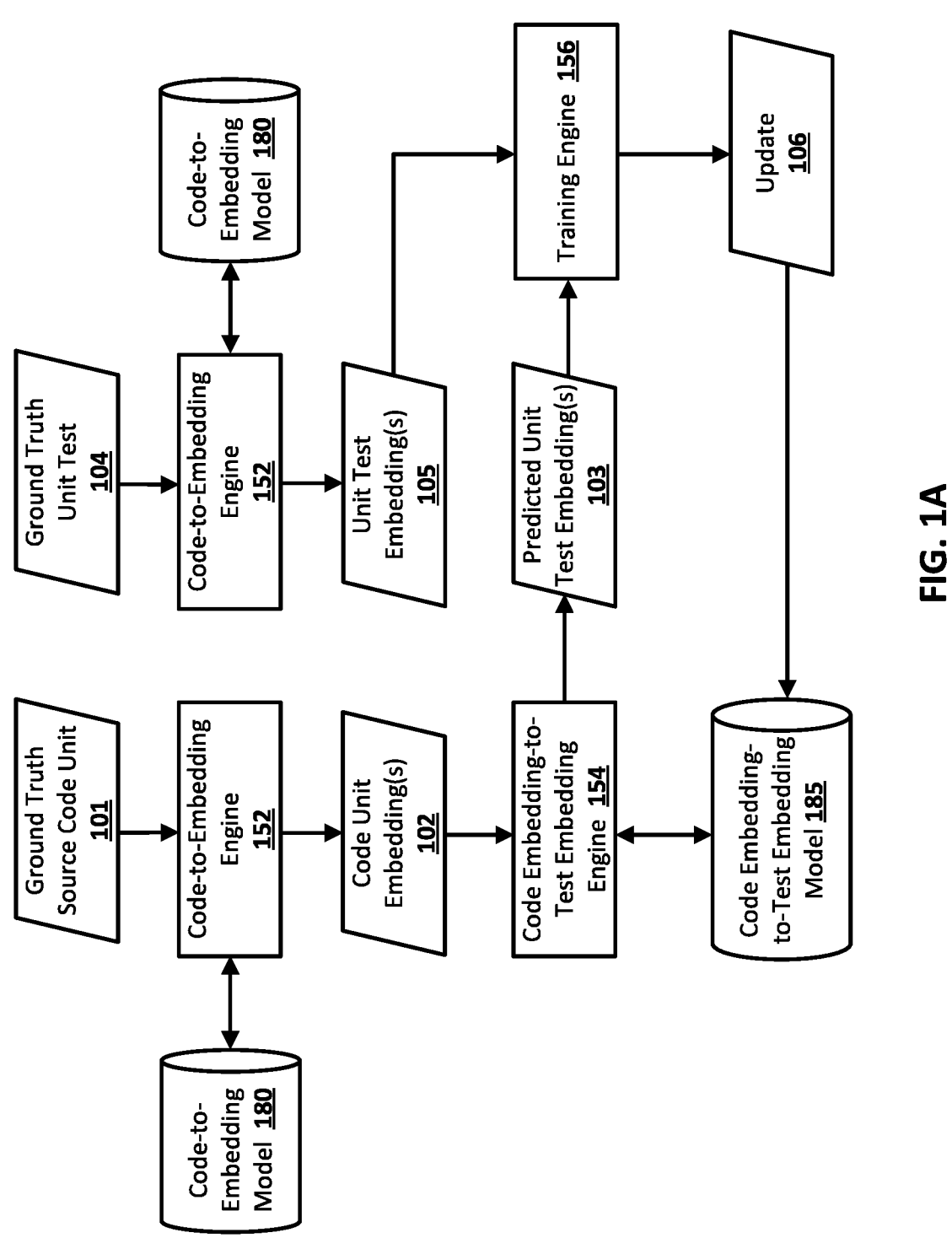
FIG. 1A is a block diagram showing an example of how various components can interact in training a code embedding-to-test embedding model, in accordance with various implementations.

Referring initially to FIG. 1A, a block diagram is illustrated and provides an example of how various components can interact in training a code embedding-to-test embedding model, in accordance with various implementations.

FIG. 1A is a block diagram showing an example of how various components can interact in training a code embedding-to-test embedding model 185, in accordance with various implementations. FIG. 1A includes a ground truth source code unit 101 and a ground truth unit test 104 for the ground truth source code unit 101. The ground truth source code unit 101 can be, for example, a method (function) in a class or other code unit. The ground truth unit test 104 is one that is generated (e.g., by a human developer) for unit testing of the ground truth source code unit 101. The ground truth unit test 104 can itself include source code. The ground truth source code unit 101 and ground truth unit test 104 can be considered a pair since the unit test 104 is specifically generated for the ground truth source code unit. The pair can be identified, for example, from one or more publicly accessible Internet code repositories and/or one or more access-restricted repositories that each include multiple instances of source code and unit tests, with some indication of relations between the source code and unit tests.

The code-to-embedding engine 152 processes the ground truth source code unit 101, using code-to-embedding model 180, to generate code unit embedding(s) 102. For example, a single code unit embedding can be generated that embeds the entirety of the code unit or, alternatively, multiple code unit embeddings can be generated and can collectively embed the entirety of the code (while individually embedding a portion of the code). The code-to-embedding engine 152 (or another instance thereof) also separately processes the ground truth unit test 104, using the code-to-embedding model 180, to generate unit test embedding 105. For example, a single unit test embedding can be generated that embeds the entirety of the unit test or, alternatively, multiple unit test embeddings can be generated and can collectively embed the entirety of the unit test (while individually embedding a portion of the unit test).

The unit embedding(s) 102 and the unit test embedding(s) 105 are both in the same latent space, which can be a reduced-dimensionality (relative to the source code and unit test) space. The code-to-embedding model 180 can be trained to process source code and generate a lower-dimensional embedding thereof such that, for example, embeddings for functionally and/or semantically similar source code pairs will be close (distance-wise) to one another in the latent space while embeddings for dissimilar instances of source code pairs will be farther away from one another in the latent space.

In some implementations, the code-to-embedding model 180 is a code2vec model, a CodeBERT model, or other model(s)). In some implementations, the code-to-embedding model is a graph neural network (GNN) model. In at least those implementations, processing the ground truth source code unit 101 and the ground truth unit test 104 can include converting each to a corresponding graph structure, and processing the graph structure using the GNN. For example, an abstract syntax tree ("AST") can be generated for the ground truth source code unit 101, and the AST can be processed using the GNN.

As described below, the code unit embedding(s) 102 and the unit test embedding(s) 105 can, collectively, form a training instance for training the code embedding-to-test embedding model 185. More particularly, the code unit embedding(s) 102 can be training instance input and the unit test embedding(s) 105 can be ground truth training instance output.

A code embedding-to-test embedding engine 154 processes the code unit embedding(s) 102 using code embedding-to-test embedding model 185, to generate predicted unit test embedding(s) 103. The code embedding-to-test embedding model 185 can be, for example, a transformer neural network model, an encoder-decoder neural network model, and/or other neural network model. In various implementations, the predicted unit test embedding(s) 103 are also in the latent space. Accordingly, in those implementations the input space and the output space, of the code embedding-to-test embedding model 185, are of the same dimension.

The predicted unit test embedding(s) 103 are provided to training engine 156. Training engine 156 compares the predicted unit test embedding(s) 103 to unit test embedding 105. Based on the comparison, and optionally other comparison(s) for other training instances (e.g., in batch techniques), the training engine 156 provides an update 106 to parameter(s) of the code embedding-to-test embedding model 185. For example, the training engine 156 can determine a loss based on the comparison of the predicted unit test embedding(s) 103 to unit test embedding 105, such as a loss that is based on the distance between the two embeddings (with a greater loss corresponding to greater distance). The training engine 156 can then provide the update 106 to the model 185 based on the loss, and optionally other loss(es) generated based on other training instance(s). For example, the update 106 can be a backpropagation of the loss.

For simplicity, FIG. 1A only illustrates a single training instance for training the code embedding-to-test embedding model 185. However, it is understood that additional training instances will be generated, using different ground truth source code unit, ground truth unit test pairs. More particularly, the additional training instances will each include code unit embedding(s) for a corresponding one of the ground truth source code units and unit test embedding(s) for a corresponding one of the ground truth unit tests.

Through training on a large quantity of training instances, the code embedding-to-test embedding model 185 is trained for use in processing code unit embedding(s), of a code unit, to generate predicted unit test embedding(s) that reflect an embedding for a unit test that is appropriate for the code unit. Functionally, the code embedding-to-test embedding model 185, through training, effectively learns a mapping between code unit embeddings and counterpart unit test embeddings.

Figure 1B:
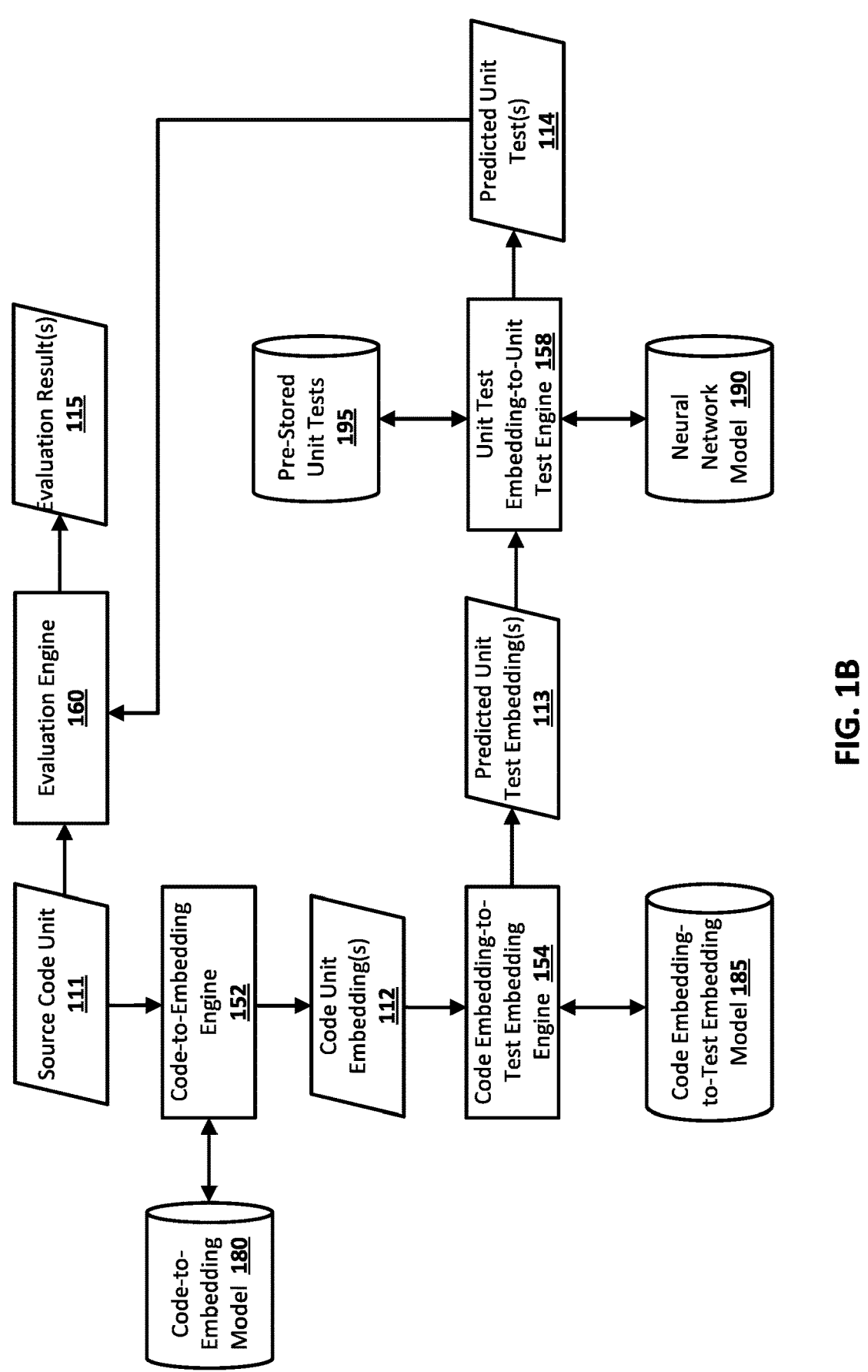
FIG. 1B is a block diagram showing an example of how various components can interact in generating a predicted unit test(s), for a source code unit, and using the unit test(s) in evaluating the source code unit.

Referring now to FIG. 1B, a block diagram is illustrated showing an example of how various components can interact in generating predicted unit test(s) 114, for a source code unit 111, and using the predicted unit test(s) 114 in evaluating the source code unit 111. The utilized components include code embedding-to-test embedding model 180, after it has been trained (e.g., as described with respect to FIG. 1A).

In FIG. 1B, the code-to-embedding engine 152 processes the source code unit 111, using code-to-embedding model 180, to generate code unit embedding(s) 112. The source code unit 111 can be, for example, a base source code unit or a translated source code unit that was translated (e.g., automatically) from a base source code unit.

The code embedding-to-test embedding engine 154 processes the code unit embedding(s) 112, using the trained code embedding-to-test embedding model 185, to generate predicted unit test embedding(s) 113.

The unit test embedding-to-unit test engine 158 can then process the predicted unit test embedding(s) 113 to generate one or more predicted unit tests 114 that can be used to perform unit testing on source code unit 111.

In some implementations, the unit test embedding-to-unit test engine 158 can, in generating one or more of the predicted unit test(s), process the predicted unit test embedding(s) 113 using a neural network model trained to for use in generating predicted unit tests from predicted unit test embeddings. For example, the neural network model 190 can be trained on training instances that each include, as training instance input, an embedding of a corresponding unit test and, as training instance output, the corresponding unit test. Through training, the neural network model 190 can generate robust and accurate unit tests on the fly, including those that may not have been included in the training sets and those that are not included in the pre-stored unit tests 195 (described below).

In some additional or alternative implementations, the unit test embedding-to-unit test engine 158 can, in generating one or more of the predicted unit test(s), utilize pre-stored unit tests database 195. Pre-stored unit tests database 195 can include a plurality of previously generated (by a developer or automatically) unit tests and, for each of the unit tests, a previously generated embedding of the unit test. The unit test embedding-to-unit test engine 158 can search the previously generated embeddings to determine one (or more) that are within a threshold distance of (e.g., distance-wise) the predicted unit test embedding(s) 113. For example, the unit test embedding-to-unit test engine 158 can determine distance to various pre-stored embeddings using a cross-product between the pre-stored embeddings and embedding(s) 113 and select one or more that satisfy a distance threshold. For those pre-stored embeddings determined to satisfy the distance threshold, the unit test embedding-to-unit test engine 158 can select its corresponding pre-stored unit test as one of the predicted unit tests.

The generated predicted unit tests 114 can be used by the evaluation engine 160 in testing the source code unit 111. Further, based on that testing, the evaluation engine can generate evaluation result(s) 115. The evaluation result(s) 115 can graphically and/or audibly convey various metric(s) such as whether the unit test(s) were successful, a number of failure(s) from the unit test(s), details on the failure(s), a number of success(es) from the unit test(s), and/or other metrics. The evaluation result(s) can be caused to be rendered, for example, on a client device (not illustrated) of a developer. For instance, it can be rendered in an interface of a development application to enable the developer to efficiently ascertain whether the source code unit 111 is robust and/or accurate or, instead, requires revision(s) to ensure its accuracy. In these and other manners, developer time and associated client device resource usage need not be utilized in manually crafting unit tests. Further, in these and other manners, an automated approach is presented that enables quick and efficient unit testing to ensure that, prior to deployment of source code unit 111, that it is accurate and/or robust. In some implementations, if the evaluation result(s) meet one or more condition(s), the source code unit 111 can be deployed for live use. Such deployment can occur automatically and/or after approval from a developer (e.g., via user interface input at a client device). Optionally, whether developer approval is required can be contingent on the evaluation results 115. For example, if the evaluation results 115 show no failures, the source code unit can optionally be automatically deployed.

Figure 2A:
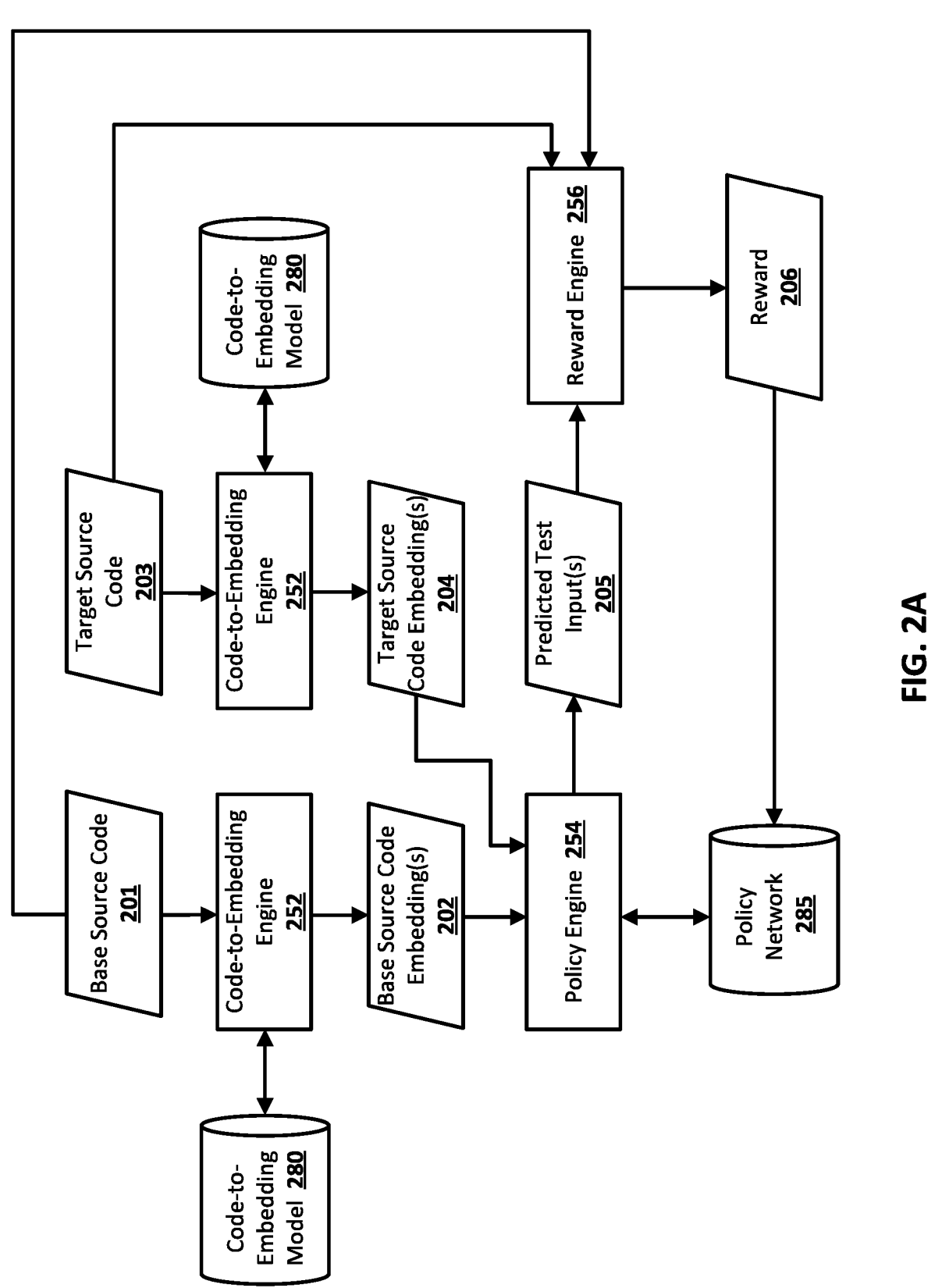
FIG. 2A is a block diagram showing an example of how various components can interact in training a policy network, in accordance with various implementations.

Referring to FIG. 2A, a block diagram is illustrated showing an example of how various components can interact in training a policy network 285, in accordance with various implementations.

FIG. 2A includes base source code 201 that is in a base programming language (e.g., Python) and target source code 203 that is in a separate target programming language (e.g., C++). Further, the target source code 203 is a translation of the base source code 201. Put another way, the target source code 203 while being in a different programming language than base source code 201 and having different content than base source code 201, is a translation of base source code 201 in that it attempts to functionally replicate the base source code 201. In some implementations, the target source code 203 can be target source code that was automatically translated from the base programming language to the target programming language, without requiring any human intervention. The automatic translation can be performed utilizing one or more machine learning models and/or rules-based approaches. The base source code 201 and the target source code 203 can each be a code unit, a code module, multiple code modules, or even an entire program.

The code-to-embedding engine 252 processes the base source code 201, using code-to-embedding model 280, to generate base source code embedding(s) 202. For example, a single base source code embedding can be generated that embeds the entirety of the base source code 201 or, alternatively, multiple base source code embeddings can be generated and can collectively embed the entirety of the base source code 201 (while individually embedding a portion of the base source code 201). The code-to-embedding engine 252 (or another instance thereof) also separately processes the target source code 203, using the code-to-embedding model 280, to generate target source code embedding(s) 204. For example, a single target source code embedding can be generated that embeds the entirety of the target source code 203 or, alternatively, multiple source code embeddings can be generated and can collectively embed the entirety of the target source code 203 (while individually embedding a portion of the target source code 203).

The base source code embedding(s) 202 and target source code embedding(s) 204 can optionally both be in the same latent space, which can be a reduced-dimensionality (relative to the base source code and target source code) space. The code-to-embedding model 280 can be trained to process source code and generate a lower-dimensional embedding thereof such that, for example, embeddings for functionally and/or semantically similar source code pairs will be close (distance-wise) to one another in the latent space while embeddings for dissimilar instances of source code pairs will be farther away from one another in the latent space.

In some implementations, the code-to-embedding model 280 is a code2vec model, a CodeBERT model, or other model(s)). In some implementations, the code-to-embedding model is a graph neural network (GNN) model. In at least those implementations, processing the base source code 201 and the target source code 203 can include converting each to a corresponding graph structure, and processing the graph structure using the GNN. For example, an abstract syntax tree ("AST") can be generated for the base source code 201, and the AST can be processed using the GNN to generate base source code embedding(s) 202. Likewise, a separate AST can be generated for the target source code 203, and the AST can be processed using the GNN to generate target source code embedding(s) 204. In various implementations, embedding source code using the GNN can enable capturing both the syntax as well as control flow properties.

The policy engine 254 acts as a reinforcement learning (RL) agent and interacts with the policy network 285, which can be a neural network model that is trained to approximate the policy by which the policy engine 254 acts. The policy engine 254 processes the base source code embedding(s) 202 and the target source code embedding(s) 204, using the policy network, and generates predicted test input(s) 205. For example, the policy engine 254 can utilize the currently trained parameter(s) of the policy network 285 to generate predicted test input(s) 205 that are contingent on those trained parameter(s) and the base source code embedding(s) 202 and the target source code embedding(s) 204. From the RL perspective, the base source code embedding(s) 202 and the target source code embedding(s) 204 form the state space, and the action taken by the policy engine 254 is the prediction of particular predicted test input(s) 205.

The reward engine 256 evaluates the action (the predicted test input(s) 205) to determine a reward 206, and uses the reward 206 to update the policy network 285. For example, the reward can be used to determine a loss that is back-propagated across the policy network 285. In various implementations, the reward 206 is determined such that it trains the policy network 285 to cause generation of predicted test input(s) that, when applied to the base source code 201 results in output that is disparate from output that results from applying the test input(s) to the target source code 203. Put another way, the reward encourages the policy network to be trained to cause generation of "corner case" test input(s) that will cause the base source code 201 and the target source code 203 to behave differently. When the policy network 285 is trained and in use, this can enable identification of where translated target source code fails to replicate corresponding base source code and should thus be refined. Additionally and/or alternatively, when the base source code and the translated target source code don't behave differently, this can provide assurances that the target source code is accurate and robust, with respect to the base source code.

In evaluating the predicted test input(s) 205 to generate the reward 206, the reward engine 256 can execute (e.g. compile, then execute) the base source code 201 using the predicted test input(s) 205. For example, the reward engine 256 can perform functional testing of the base source code 201 using the predicted test input(s) 205 to generate corresponding base output(s). Further, the reward engine 256 can execute (e.g. compile, then execute) the target source code 203 using the predicted test input(s) 205. For example, the reward engine 256 can perform functional testing of the target source code 203 using the predicted test input(s) 205 to generate corresponding target output(s). The reward engine 256 can then compare the base output(s) and the target output(s). The reward can be more positive if the comparison indicates they differ than it would be if the comparison indicates they are the same. For example, the reward 206 can be "1" if the base output(s) and the target output(s) are the same, and "0" otherwise.

For simplicity, FIG. 2A only illustrates a single instance of training the policy network 285. However, it is understood that additional instances of training will occur, and can use different base source code, target source code pairs (or the same base source code 201 and target source code 203, but with the corresponding embedding(s) indicating different branch(es) that have already been evaluated). Through continued RL training, the policy network 285 is trained to generate predicted test input(s) that are more likely to cause corresponding base source code and translated target source code to behave differently. This can be "more likely" at least with respect to randomly sampled predicted test input(s) and/or other technique(s) for generating test input(s).

Figure 2B:
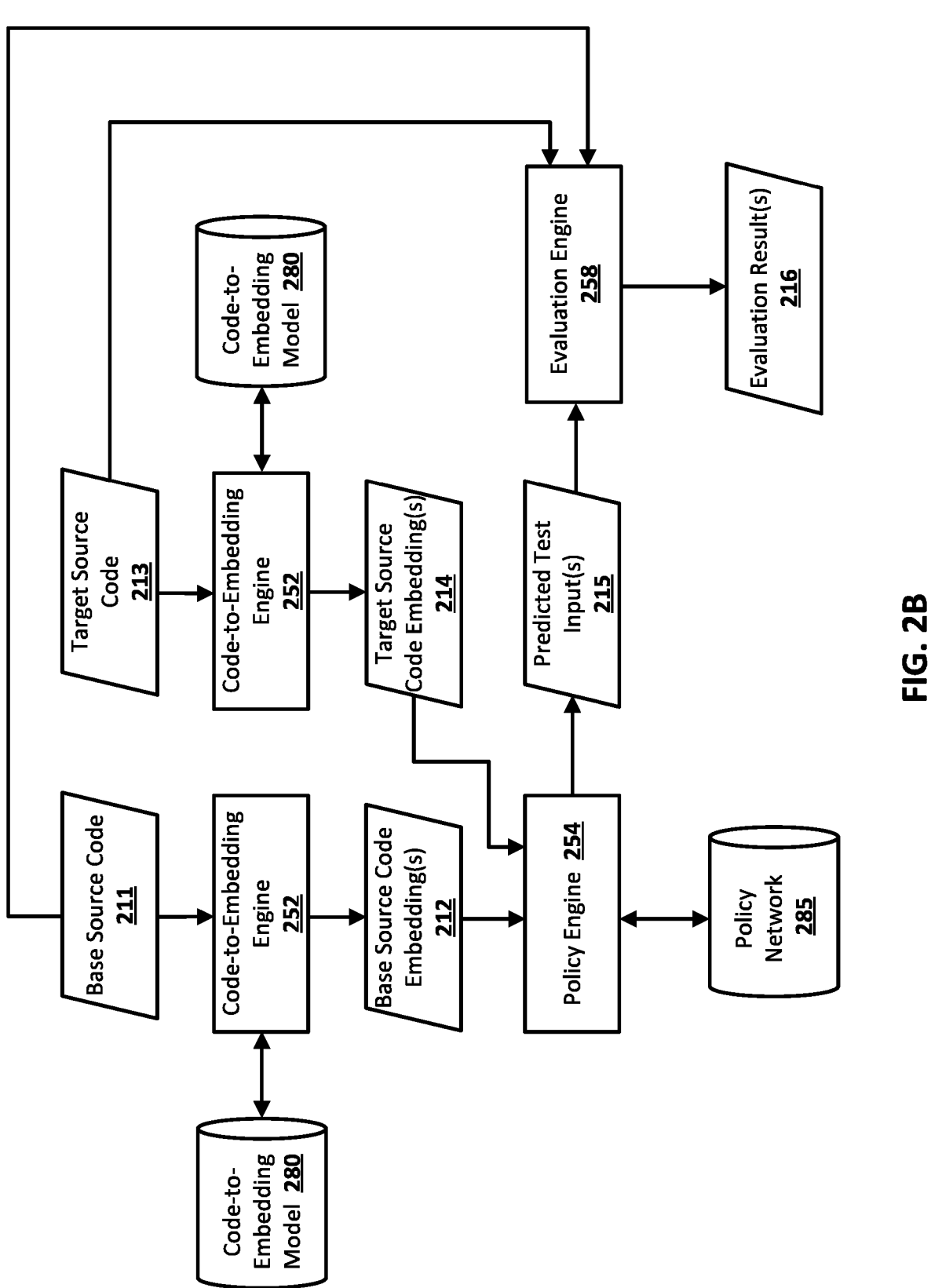
FIG. 2B is a block diagram showing an example of how various components can interact in generating predicted test input(s), for base source code and target source code that is a translation of the base source code, and using the test input(s) in evaluating the target source code relative to the base source code.

Referring to FIG. 2B, a block diagram is illustrated showing an example of how various components can interact in generating predicted test input(s) 215, for base source code 211 and target source code 213 that is a translation of the base source code 211, and using the predicted test input(s) 215 in evaluating the target source code 213 relative to the base source code 213.

In FIG. 2B, the policy network 285 is already trained using, for example, the techniques described with respect to FIG. 2A. In FIG. 2B, base source code 211 is provided that is in a base programming language (e.g., Python), as well as target source code 213 that is in a separate target programming language (e.g., C++). Further, the target source code 213 is a translation of the base source code 211.

The code-to-embedding engine 252 processes the base source code 211, using code-to-embedding model 280, to generate base source code embedding(s) 212. The code-to-embedding engine 252 (or another instance thereof) also separately processes the target source code 213, using the code-to-embedding model 280, to generate target source code embedding(s) 214.

The policy engine 254 processes the base source code embedding(s) 212 and the target source code embedding(s) 214, using the policy network, and generates predicted test input(s) 215. For example, the policy engine 254 can utilize the trained parameter(s) of the policy network 285 to generate predicted test input(s) 215 that are contingent on those trained parameter(s) and contingent on the base source code embedding(s) 212 and the target source code embedding(s) 214.

The evaluation engine 258 then evaluates the target source code 213, with respect to the base source code 211, using the predicted test input(s) 215. In evaluating the target source code 213, the evaluation engine 258 can execute (e.g. compile, then execute) the base source code 211 using the predicted test input(s) 215. For example, the evaluation engine 258 can perform functional testing of the base source code 211 using the predicted test input(s) 215 to generate corresponding base output(s). Further, the evaluation engine 258 can execute (e.g. compile, then execute) the target source code 213 using the predicted test input(s) 215. For example, the evaluation engine 258 can perform functional testing of the target source code 213 using the predicted test input(s) 215 to generate corresponding target output(s). The evaluation engine 258 can then compare the base output(s) and the target output(s), and provide evaluation result(s) 216 that are based on the comparison.

The evaluation result(s) 216 can graphically and/or audibly convey whether the target output(s) and the base output(s) matched, details on the predicted test input(s), details on the base output(s), detail(s) on the target output(s), and/or which branch(es) of the base source code 211 and/or target source code 213 were invoked in the testing. The evaluation result(s) 216 can be caused to be rendered, for example, on a client device (not illustrated) of a developer. For instance, it can be rendered in an interface of a development application to enable the developer to efficiently ascertain whether the target source code 213 effectively replicates the functionality of the base source code 211 or, instead, requires revision(s) to ensure it properly replicates the functionality. In these and other manners, developer time and associated client device resource usage need not be utilized in manually crafting functional tests. Further, the policy network 285 can, based on its training, be more likely to generate test input(s) that will lead to failure—potentially obviating the need to perform functional testing based on less likely to be fruitful test input(s) generated in other manner(s) (or at least lessening the quantity of such testing). Further, in these and other manners, an automated approach is presented that enables quick and efficient functional testing to ensure that, prior to deployment of target source code 213, that it is accurate and/or robust with respect to base source code 211. In some implementations, if the evaluation result(s) meet one or more condition(s), the target source code 213 can be deployed for live use. Such deployment can occur automatically and/or after approval from a developer (e.g., via user interface input at a client device). Optionally, whether developer approval is required can be contingent on the evaluation results 216.

Although FIGS. 1A and 1B are described separately from FIGS. 2A and 2B, it is understood that, in various implementations, technique(s) from both can be used in cooperation. For example, code unit(s) of a target source code, that is a translation of a base source code, can undergo unit testing based on FIG. 1B. Moreover, the target source code can additionally undergo functional testing based on FIG. 2B. For example, the functional testing can occur after the unit testing, and optionally after tweaks to the target source code are made based on the unit testing.

Figure 3:
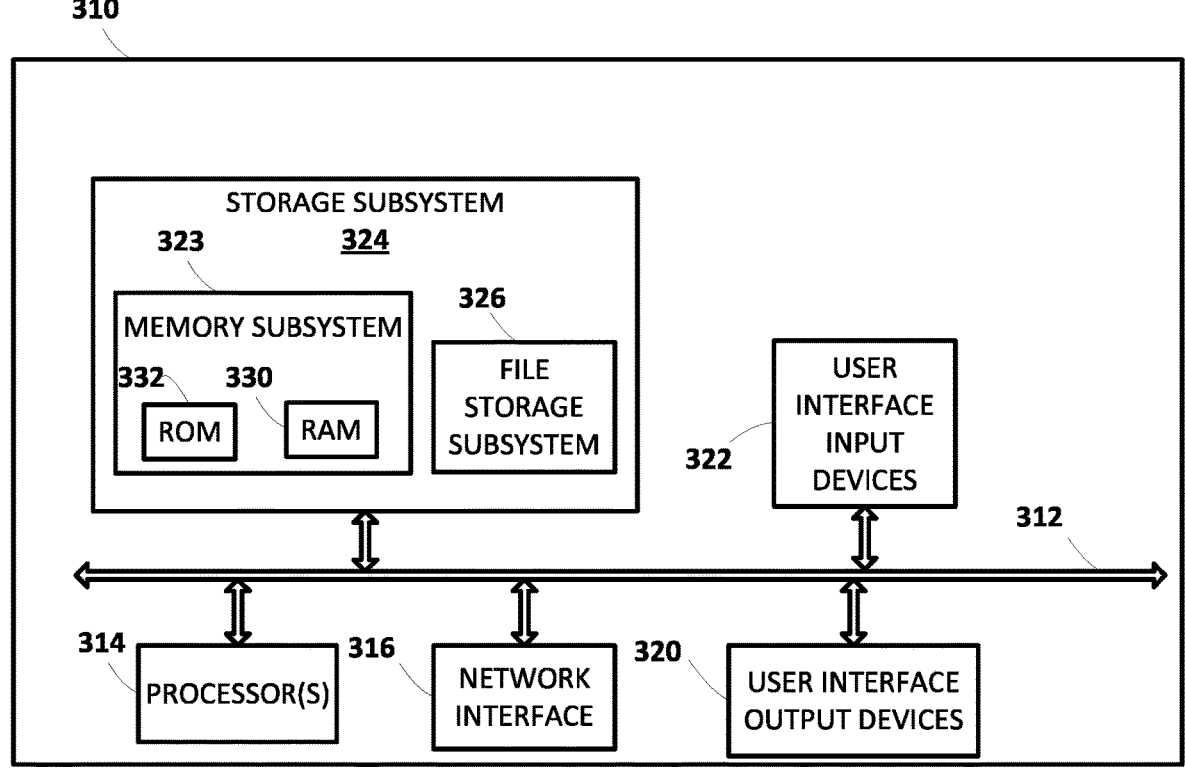
FIG. 3 illustrates an example architecture of a computing device.

FIG. 3 is a block diagram of an example computing device 310 that may optionally be utilized to perform one or more aspects of techniques described herein. Computing device 310 typically includes at least one processor 314 which communicates with a number of peripheral devices via bus subsystem 312. These peripheral devices may include a storage subsystem 324, including, for example, a memory subsystem 323 and a file storage subsystem 326, user interface output devices 320, user interface input devices 322, and a network interface subsystem 316. The input and output devices allow user interaction with computing device 310. Network interface subsystem 316 provides an interface to outside networks and is coupled to corresponding interface devices in other computing devices.

User interface input devices 322 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 310 or onto a communication network.

User interface output devices 320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 310 to the user or to another machine or computing device.

Storage subsystem 324 stores programming and data constructs that provide the functionality of some or all of the modules described herein. For example, the storage subsystem 324 may include the logic to perform selected aspects of FIGS. 1A, 1B, 2A, and 2B, as well as to implement various components depicted in FIGS. 1A, 1B, 2A, and 2B.

These software modules are generally executed by processor 314 alone or in combination with other processors. Memory 323 used in the storage subsystem 324 can include a number of memories including a main random access memory (RAM) 330 for storage of instructions and data during program execution and a read only memory (ROM) 332 in which fixed instructions are stored. A file storage subsystem 326 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 326 in the storage subsystem 324, or in other machines accessible by the processor(s) 314.

Bus subsystem 312 provides a mechanism for letting the various components and subsystems of computing device 310 communicate with each other as intended. Although bus subsystem 312 is shown schematically as a single bus, alternative implementations of the bus subsystem may use multiple busses.

Computing device 310 can be of varying types including a workstation, server, computing cluster, blade server, server farm, or any other data processing system or computing device. Due to the ever-changing nature of computers and networks, the description of computing device 310 depicted in FIG. 3 is intended only as a specific example for purposes of illustrating some implementations. Many other configurations of computing device 310 are possible having more or fewer components than the computing device depicted in FIG. 3.

What is claimed is:

1. A method implemented by one or more processors, the method comprising:

identifying a source code unit that is programmed in a programming language; processing the source code unit, using a code-to-embedding machine learning model, to generate one or more code unit embeddings in a latent space;

processing the one or more code unit embeddings, using a code embedding-to-test embedding machine learning model, to generate one or more predicted unit test embeddings in the latent space;

using the one or more predicted unit test embeddings to identify a unit test for the source code unit; and evaluating the source code unit using at least the unit test, wherein evaluating the source code unit using at least the unit test comprises:

executing the source code unit, using test inputs of the unit test, to generate source code unit output, and evaluating the source code unit based on the source code unit output.

2. The method of claim 1, wherein using the one or more predicted unit test embeddings to identify the unit test for the source code unit comprises:

processing the one or more predicted unit test embeddings, using an embedding-to-code machine learning model, to generate the unit test for the source code unit.

3. The method of claim 2, wherein processing the one or more predicted unit test embeddings, using the embedding-to-code machine learning model, to generate the unit test for the source code unit comprises:

generating a sequence of outputs based on processing the one or more predicted unit test embeddings using the embedding-to-code machine learning model, wherein the outputs of the sequence each comprise a corresponding probability distribution; and generating the unit test based on highest probabilities in the corresponding probability distributions of the sequence of outputs.

4. The method of claim 1, wherein using the one or more predicted unit test embeddings to identify the unit test for the source code unit comprises:

determining that the one or more predicted unit test embeddings satisfy a distance threshold relative to one or more pre-generated unit test embeddings for the unit test, wherein the one or more pre-generated unit test embeddings are generated by processing the unit test using the code-to-embedding machine learning model; and responsive to determining that the one or more predicted unit test embeddings satisfy the distance threshold relative to the one or more pre-generated unit test embeddings for the unit test:

identifying the unit test.

5. The method of claim 1, further comprising:

determining, based on the evaluating, to deploy the source code unit in production.

6. The method of claim 1, further comprising:

causing rendering, in a development application, of one or more metrics that are based on the evaluating.

7. The method of claim 1, wherein the source code unit is in a second programming language and is an automated translation of a corresponding source code unit in a first programming language that is different from the second programming language, and further comprising:

determining, based on the evaluating, whether to render the source code unit in a development application as a suggested translation of the corresponding source code unit.

8. The method of claim 1, wherein the source code unit is one of multiple candidate automated translations of the corresponding source code unit and wherein determining, based on the evaluating, whether to render the source code unit in the development application as the suggested translation comprises:

determining, based on the evaluating, whether to render the source code unit, or an alternate one of the automated translations, as a suggested translation of the corresponding source code unit.

9. The method of claim 1, wherein the code embedding-to-test embedding machine learning model is a transformer neural network model or an encoder-decoder neural network model.

10. A method implemented by one or more processors, the method comprising:

identifying base source code that is programmed in a base programming language;

identifying target source code that is in a target programming language and that is generated based on automatically translating the base source code;

processing the base source code, using a code-to-embedding machine learning model, to generate a base source code embedding in a latent space;

processing the target source code, using the code-to-embedding machine learning model, to generate a target source code embedding in the latent space;

processing, using a policy network, the base source code embedding and the target source code embedding, to generate a predicted test input;

executing the base source code using the predicted test input to generate a base output;

executing the target source code using the predicted test input to generate a target output; and determining, based on comparing the base output and the target output, whether one or more branches of the target source code are a valid translation of the base source code.

11. The method of claim 10, wherein determining, based on comparing the base output and the target output, whether one or more branches of the target source code are a valid translation of the base source code, comprises:

determining, based on the base output and the target output not being equal, that at least a given branch, involved in executing the target source code, is not a valid translation.

12. The method of claim 11, further comprising:

responsive to determining that at least the given branch, involved in executing the target source code, is not a valid translation:

causing the given branch to be rendered, in a development application, with a particular demarcation.

13. The method of claim 10, wherein the policy network is trained, through reinforcement learning, to reward predictions of test inputs that result in differing outputs when used in testing a base source code, target source code pair.

14. The method of claim 10, further comprising:

automatically translating the base source code to generate the target source code, wherein identifying the target source code is responsive to automatically translating the base source code to generate the target source code.

15. A system, comprising:

memory storing instructions;

one or more processors operable to execute the instructions to:

identify a source code unit that is programmed in a programming language;

process the source code unit, using a code-to-embedding machine learning model, to generate one or more code unit embeddings in a latent space;

process the one or more code unit embeddings, using a code embedding-to-test embedding machine learning model, to generate one or more predicted unit test embeddings in the latent space;

use the one or more predicted unit test embeddings to identify a unit test for the source code unit; and evaluate the source code unit using at least the unit test, wherein in evaluating the source code unit using at least the unit test one or more of the processors are to:

execute the source code unit, using test inputs of the unit test, to generate source code unit output, and evaluate the source code unit based on the source code unit output.

16. The system of claim 15, wherein in using the one or more predicted unit test embeddings to identify the unit test for the source code unit one or more of the processors are to:

process the one or more predicted unit test embeddings, using an embedding-to-code machine learning model, to generate the unit test for the source code unit.

17. The system of claim 16, wherein in processing the one or more predicted unit test embeddings, using the embedding-to-code machine learning model, to generate the unit test for the source code unit one or more of the processors are to:

generate a sequence of outputs based on processing the one or more predicted unit test embeddings using the embedding-to-code machine learning model, wherein the outputs of the sequence each comprise a corresponding probability distribution; and generate the unit test based on highest probabilities in the corresponding probability distributions of the sequence of outputs.

18. The system of claim 15, wherein one or more of the processors are further operable to execute the instructions to:

determine, based on the evaluating, to deploy the source code unit in production.

19. The system of claim 15, wherein one or more of the processors are further operable to execute the instructions to:

cause rendering, in a development application, of one or more metrics that are based on the evaluating.

* * * * *